April 8, 1958 L. WOLIN ET AL 2,829,826
DYNAMIC ENGINE SIMULATOR
Filed Sept. 4, 1952 4 Sheets-Sheet 1
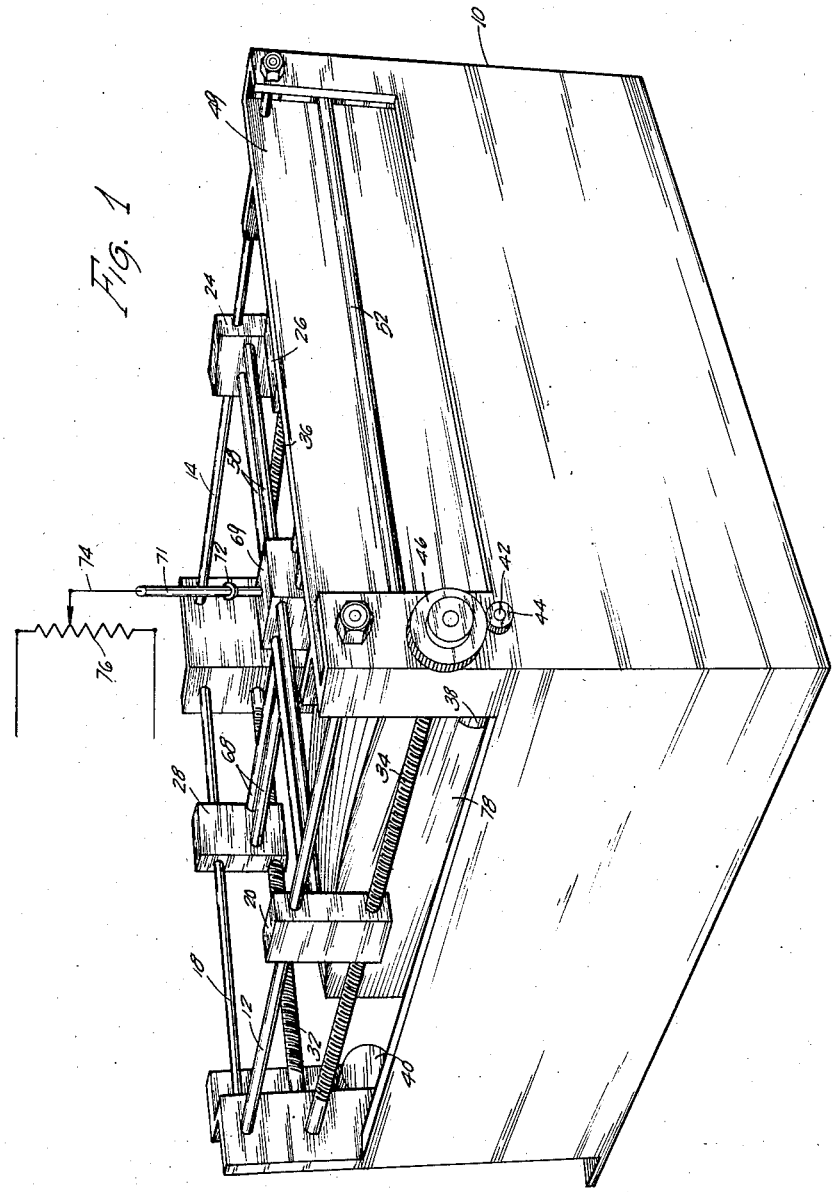
INVENTOR.
LOUIS WOLIN
ARTHUR M. CARTER, JR.
BY
ATTORNEYS April 8, 1958 L. WOLIN ET AL 2,829,826
DYNAMIC ENGINE SIMULATOR
Filed Sept. 4, 1952 4 Sheets-Sheet 2
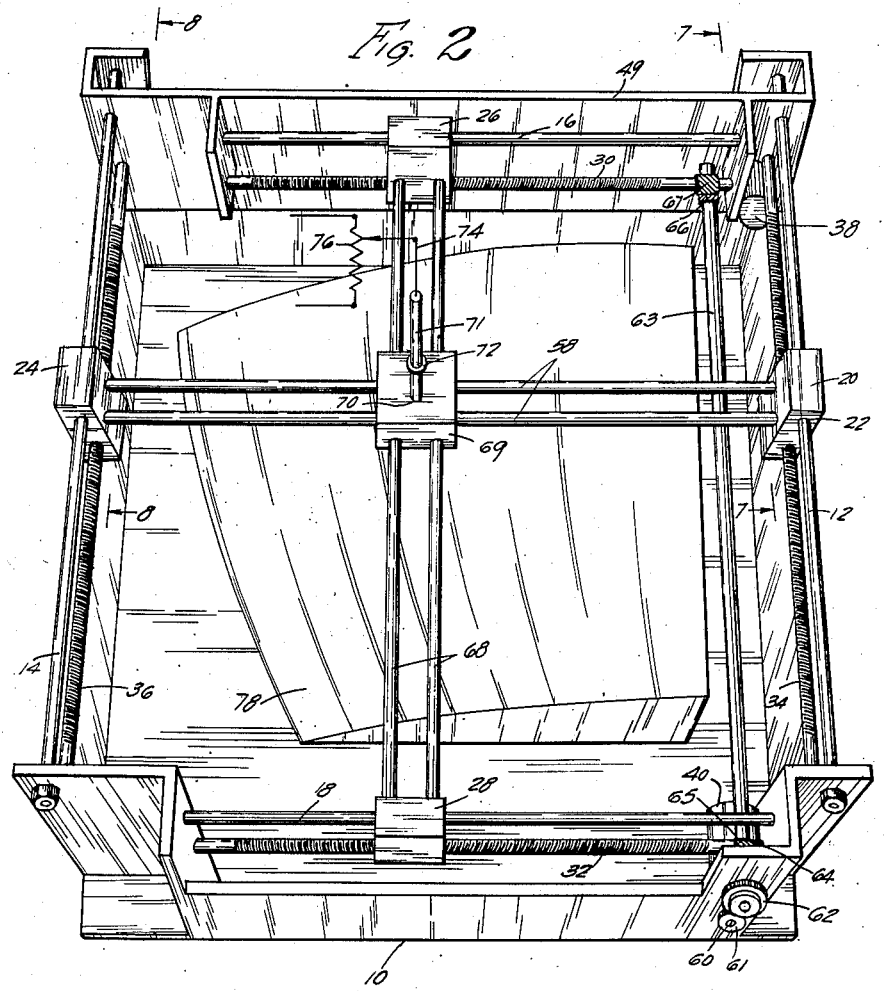
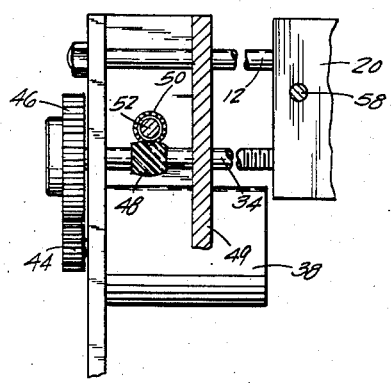
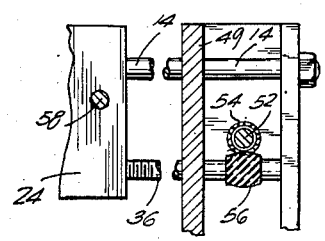
INVENTOR.
LOUIS WOLIN
ARTHUR M. CARTER, JR.
BY
ATTORNEYS April 8, 1958 L. WOLIN ET AL 2,829,826
DYNAMIC ENGINE SIMULATOR
Filed Sept. 4, 1952 4 Sheets-Sheet 3
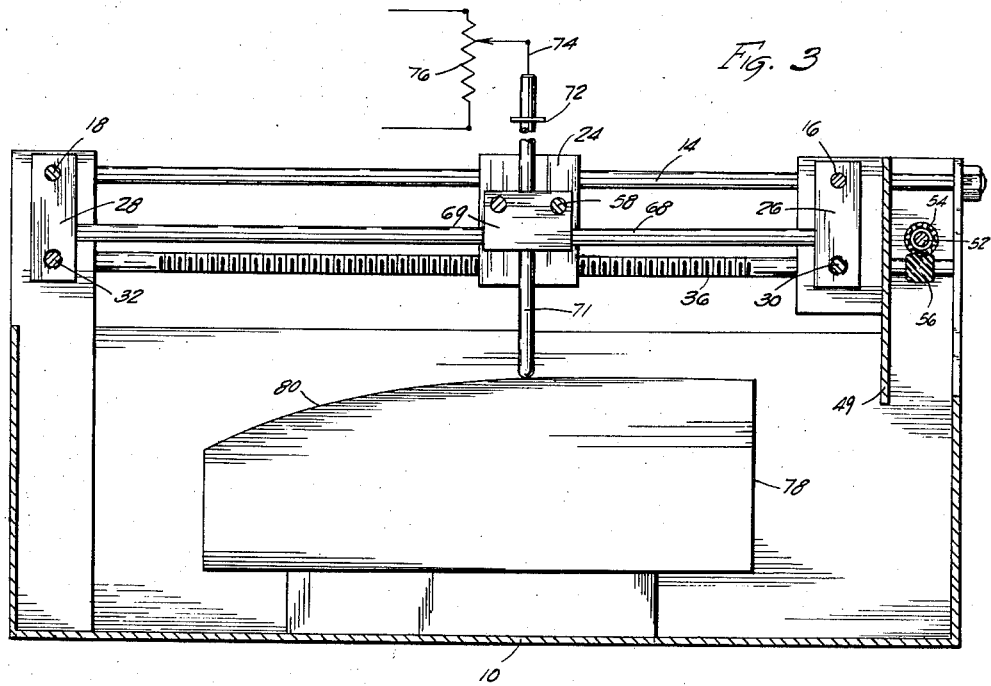
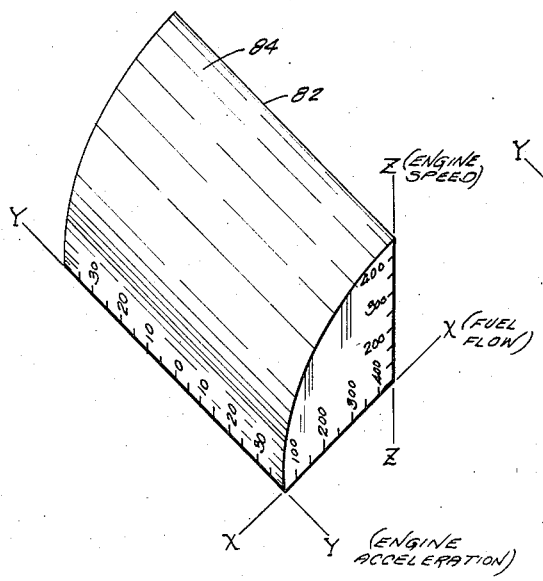
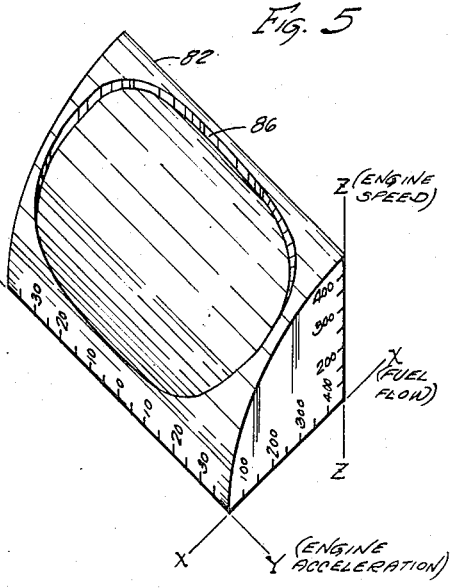
INVENTOR.
LOUIS WOLIN
ARTHUR M. CARTER, JR.
BY
ATTORNEYS

INVENTOR.
LOUIS WOLIN
ARTHUR M. CARTER, JR.
BY
ATTORNEYS

2,829,826

DYNAMIC ENGINE SIMULATOR

Louis Wolin, Philadelphia, and Arthur M. Carter, Jr., Rosemont, Pa.

Application September 4, 1952, Serial No. 307,945

7 Claims. (Cl. 235—61)

(Granted under Title 35, U. S. Code (1952), sec. 266)

The invention described herein may be manufactured and used by or for the Government of the United States of America for governmental purposes without the payment of any royalties thereon or therefor.

This invention relates to a device for simulating the dynamic characteristics of a moving system and particularly relates to a device for simulating such characteristics over the complete operating regime of the system.

Although this invention can be used to simulate the dynamic characteristics of any number of different kinds of moving systems, the inventive concept is explained and described here in its particular application to an engine such as a turbo-jet or turbo-prop engine.

The derivation of a correct representation of the engine requires the correlation of such variables as engine speed, fuel flow, engine pressures, temperatures, burner efficiency and the like, as well as ram and altitude considerations in the case of jet engines. Fortunately, however, many variables can be determined uniquely from a consideration of the physics of the problem and a few independent and dependent variables.

Although it is obvious that the response of an engine is dependent upon the fuel flow input as a function of time, it is not always easy from theory to predict the effects on the response of variations in the input function. The principal reason for this difficulty is the inability to define accurately the non-linear configuration of the curve of performance, or differential equation, of the engine in its dynamic state. It is absolutely essential, however, to be able to predict these effects and to be able to define the characteristics of the engine or other physical system before any kind of controls, whether automatic or nonautomatic, can be devised to give optimum performance. Heretofore, it has been attempted to obtain a dynamic representation of a moving system such as an engine by the use of linear differential equations or by the use of an actual engine. These methods, however, were inadequate. Linear differential equations can be used only for changes about a steady state operating point over which the assumption of linearity is valid. The stability and general behavior of such systems may be studied by the application of the principles of the theory of small oscillations, but this method leads to linear differential equations with constant parameters. In most cases, it is difficult to get accurate differential equations of motion, due to the complexity of a system such as a jet engine, and to the variable effects of damping, friction, burner efficiency, etc. of the engine. Furthermore, the linear system requires a recalculation of the parameters for each operating condition of the engine, such as of the speed, ram thrust, and altitude. There is, furthermore, no assurance that if a system is stable for small changes or perturbations that it will be stable for large changes in these variables.

Insofar as regards the use of an actual operating system such as an engine for testing purposes, the necessity to actually build the engine, merely to study its characteristics, is an expensive, inefficient, and time consuming procedure which is to be avoided if at all possible. If such an engine is built, any change which must be made in the control element requires the overhaul of the control. For example, if the stiffness of a spring, the area of a piston, or a flow coefficient must be changed, the entire control may have to be altered. Furthermore, the engine is subject to undue wear and possible destruction. In addition, in regard to an airplane engine, it is difficult to obtain altitude data since most controls are checked under sea-level conditions.

It is, therefore, one object of this invention to provide a means for accurately simulating the dynamic characteristics of a moving system over its complete operating regime.

Another object of this invention is to provide a nonlinear representation of a dynamic system.

Another object of this invention is to determine the dynamic control system requirements of an engine.

Another object of this invention is to provide a device which is capable of quickly showing the non-linear characteristics of a moving system at any instantaneous period of time.

Another object of this invention is to determine the type and characteristics of the control system required to obtain optimum transient and steady-state engine performance.

Another object of this invention is to determine the physical dimensions and characteristics required for each element of the control means for a moving system.

Another object of this invention is to determine the effect of changes of altitude, temperature, pressure, etc., on the transient and steady-state performance of an engine when the parameters of the control system are held constant.

Another object of this invention is to provide a dynamic engine simulator which is sturdy in construction, simple in operation and which is easily and economically produced.

Other objects and many of the attendant advantages of this invention will be readily appreciated as the same becomes better understood by reference to the following detailed description when considered in connection with the accompanying drawings wherein:

Fig. 1 is a perspective view of the simulator device showing the assembly of parts.

Fig. 2 is a top perspective view of the device shown in Fig. 1.

Fig. 3 is a view of the frame in section and of the elements in elevation.

Fig. 4 is a perspective view of the simulator cam block.

Fig. 5 is a perspective view of a modified form of cam block.

Fig. 7 is a sectional view taken on line 7—7 of Fig. 2.

Fig. 8 is a sectional view taken on line 8—8 of Fig. 2.

Figure 6:
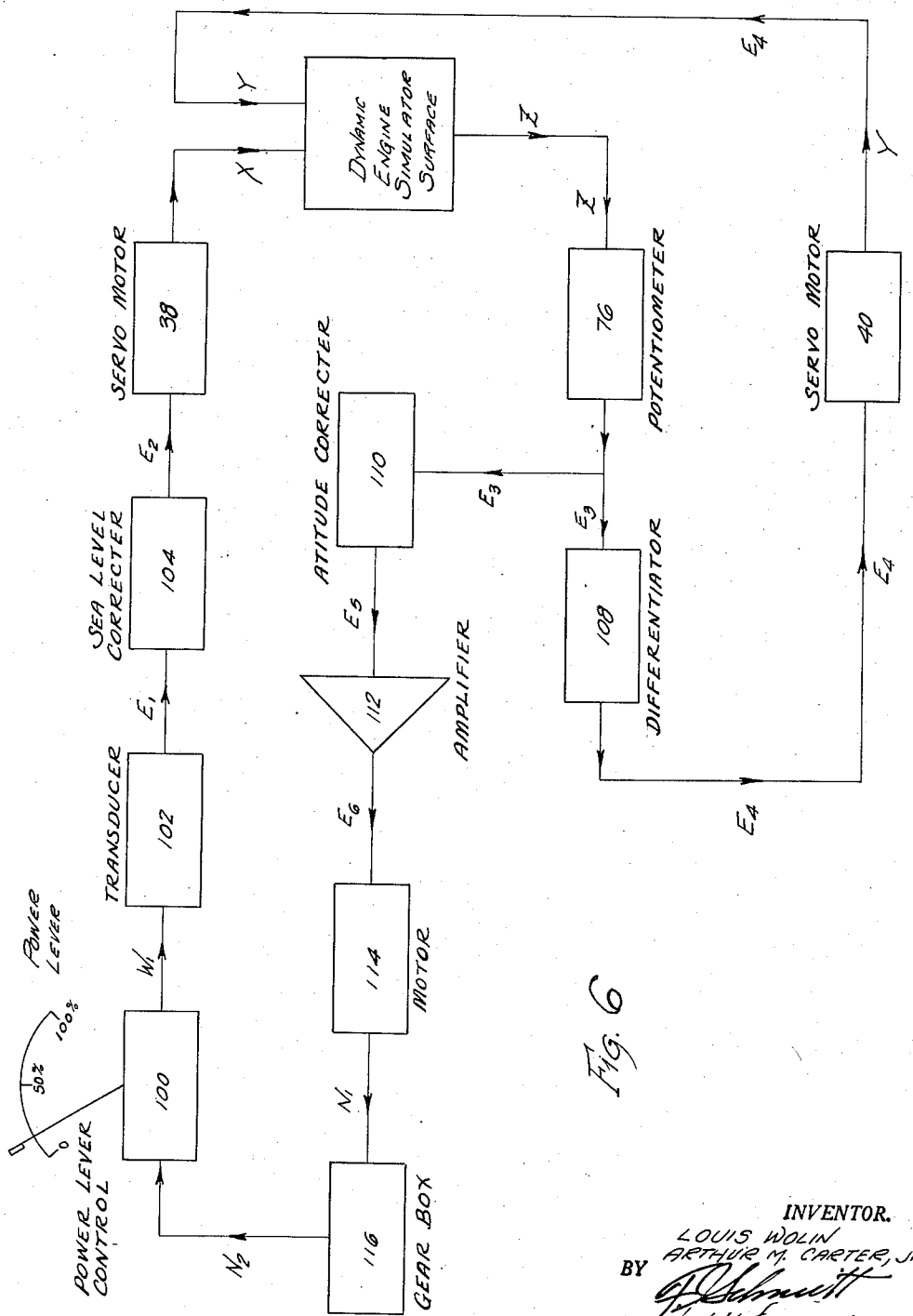
Fig. 6 is a schematic diagram showing the application of the simulator for test-bench testing of a control.

Referring now in detail to the drawings wherein similar reference characters refer to similar parts, there is shown a frame 10 in which are mounted two pairs of parallel guide bars, the first pair being shown at 12 and 14 and the second pair at 16 and 18. Each pair is perpendicular to the other.

A block 20 is mounted on the guide bar 12 for reciprocation thereon. The block has a bore 22 therein and the bar 12 extends through this bore. A similar block 24 is mounted on the guide bar 14 in a similar manner. The blocks 26 and 28 are similar to the blocks 20 and 24 and are respectively mounted for reciprocation on guide bars 16 and 18 in a manner similar to blocks 20 and 24 on bars 12 and 14.

Threaded shafts 30, 32, 34 and 36, forming spiral gears, are mounted in the frame 10 just below the bars 12, 14, 16 and 18 and are also adapted to pass through threaded bores in the blocks, these threaded bores being positioned below the bores for the guide bars.

Motors 38 and 40 are mounted on opposite sides of the frame. The motor shaft 42 of motor 38 extends through the frame wall and is provided with a gear 44. This gear 44 meshes with a gear 46 which is mounted on one end of the threaded shaft 34 which extends through the frame wall. The gear ratio between the gears 44 and 46 as used in the device illustrated is 3 to 1.

The gear 46 drives the threaded shaft 34 to move the block 20 in one direction or the other along the guide bar 12.

The threaded shaft 34 is provided with a gear 48 on the opposite side of frame wall 49 and this gear 48 meshes with a 90 degree off-set gear 50 on a shaft 52 which is positioned adjacent the outer face of wall 49. The shaft 52 is provided with a gear 54 at its opposite end and this gear 54 meshes with a 90 degree offset gear 56 on threaded shaft 36 which acts to move the block 24 in the same direction as block 20. A pair of parallel rods 58 extend between the blocks 20 and 24 and are connected at their respective ends to these blocks.

The motor 40 has a shaft 60 which is provided with a gear 61 similar to gear 44. Gear 61 meshes with a gear 62 similar to gear 46 which drives a shaft 63, the other end of which is journaled in wall 49. This shaft 63 has a gear 64 adjacent the motor 40 which meshes with a 90 degree off-set gear 65 at one end of threaded shaft 32. Threaded shaft 32, as it rotates, moves block 28 in one direction or the other. A gear 66 at the opposite end of shaft 63, adjacent wall 49 meshes with a 90 degree off-set gear 67 on one end of threaded shaft 30, which, in turn, sets to move block 26 in synchronism with block 28. A pair of parallel rods 68 extend between and are connected to the blocks 26 and 28.

The rods 58 and 68 all pass through a block 69 and as these rods are moved in one direction or the other by their respective blocks, they carry the block 69 along with them. If both sets of rods are activated at the same time, the block will move in a resultant or vector direction.

The block 69 is provided with a central bore 70 and through this bore extends a follower pin 71. A stop flange 72 is formed on the pin 71 to prevent its falling through the bore 70 and to limit its vertical movement in the bore. A slide wire 74 shown schematically in Figs. 1, 2 and 3 is mounted on the upper end of the follower pin and is adapted to move along the potentiometer 76 mounted on the block 69 as the follower pin moves vertically in its bore. The potentiometer transforms the movement of the follower into a voltage proportional to the extent of such movement.

The vertical position of the follower pin 71 and the resulting electrical impulse directed through the slide wire to the potentiometer is attained by the follower pin riding over a similator cam block 78.

The cam block 78 is positioned below the follower block 69 and provides for a movement of the follower pin in the Z direction whereas the movement of the rods 58 and 68 provide for its movement in the X and Y directions. The follower pin, therefore, transmits information to the circuit in regard to a three-dimensional or non-linear curve.

The cam block 78, here shown, is used to represent the dynamic characteristics of a turbo-jet or turbo-prop engine over its complete operating regime. The purpose here is to obtain information regarding the instantaneous engine speed at any instantaneous fuel flow and instantaneous engine acceleration at predetermined environmental conditions such as a change of altitude, temperature, pressure, etc.

When there is an increase in fuel flow, there will be an increase in positive engine acceleration with an increase of engine speed. When there is a decrease in fuel flow, there will be a negative acceleration with a consequent decrease in engine speed. For a given instantaneous fuel flow, a relationship may be obtained between instantaneous acceleration and instantaneous engine speed. The simulator of this invention is used to measure the exact relationships between these three variables at any given instant in any given environment.

On the cam surface 80 of the cam block 78, the fuel flow of the engine is represented by the X-axis, the engine acceleration by the Y-axis, and the engine speed by the Z-axis.

The fuel flow X-axis is a linear scale, divided into unit lengths representing a specified increment of fuel flow, such as one unit of X is equal to 100 gals./hr. The fuel flow is continuously represented by positioning the follower in the X direction a distance proportional to the instantaneous fuel flow.

The engine acceleration Y-axis is a linear scale divided into unit lengths representing a specified increment of engine acceleration, such as one unit of Y is equal to 10 R. P. M./sec. This axis has a center line origin which represents zero acceleration and which extends in two directions from the origin, one direction representing a positive and the other direction representing a negative acceleration.

The engine speed Z-axis is a linear scale divided into unit lengths representing increments of engine speed, such as one unit of Z is equal to 100 R. P. M.

The lower end of the follower pin 70 rides at all times on the cam surface 80 of the cam block. By positioning the follower in the X and Y directions, distances proportional to the instantaneous fuel flow and instantaneous acceleration respectively, the upper end of the follower will be moved in the Z direction to a position proportional to the instantaneous engine speed, and the movement in this Z direction is transposed into the voltage which is then transmitted to the computer system through the slide wire and potentiometer, as described above.

A simulator block 82 having a cam surface 84 is shown in Fig. 4 and a modification of this simulator cam block is shown in Fig. 5 wherein the block is designed to take into consideration the design limitations of an engine, such as maximum permissible engine speed, temperature, acceleration, fuel flow, etc. Any of these limitations can be introduced by limiting the cam surface 84 over which the follower is adapted to travel. This is accomplished by placing a raised lip 86 on the surface, the lip being designed in accordance with the required limitations. The dynamic operating regime of the engine is, thereby, described by the area of cam surface over which the follower may travel. A circuit breaker means, not shown, is used to break the electrical contact when the follower reaches any portion of the limiting lip.

In operation, a voltage $E_2$ proportional to instantaneous fuel flow is fed to the fuel flow position servomotor 40. This causes the motor to turn the threaded gear shafts 30 and 32, thereby moving the rods 68 in the X direction a distance proportional to the instantaneous fuel flow.

A voltage $E_4$, proportional to instantaneous acceleration, is used to position servomotor 38. This causes motor 38 to turn the shafts 34 and 36, thereby moving the rods 58 in the Y direction a distance proportional to the instantaneous acceleration.

The movement of the rods 58 and 68 by the servomotors 38 and 40 moves the block 69 in the resultant vector direction and allows the follower to move in the Z direction as it rides over the cam block.

In Fig. 6 is shown a schematic diagram of the circuit for test-bench testing of a control by means of the simulator.

The power lever of the control 100 is set to the desired engine power. The resulting fuel flow $W_1$ is fed into a transducer 102, the output of which is $E_1$. This voltage $E_1$ is fed into correcting device 104 which corrects to sea-level conditions, giving $E_2$. This voltage $E_2$ is fed into the fuel flow position servomotor 38 resulting in the turning of the threaded shaft 34 and the movement of the block 69 described above. The resulting movement in the Z direction acts on the potentiometer causing an instantaneous output voltage $E_3$. This voltage $E_3$ from the potentiometer 76 is fed into differentiator 108. The output of the differentiator is $E_4$ which is then fed back into the simulator through the servomotor 40 and shaft 63 to position the block 69 along the Y axis.

The output voltage $E_3$ of the potentiometer is also fed into the altitude correction device 110, the output of this being $E_5$. This voltage $E_5$ is then amplified by amplifier 112 and the resulting output $E_6$ is fed into motor 114. The output $N_1$ of the motor 114 is a shaft rotation which is proportional to engine speed. This measure of shaft rotation in R. P. M.'s is fed into gear box 116. The output $N_2$ of the gear box is the actual instantaneous engine speed. This output $N_2$ is used to drive the control 100.

It is to be noted here that this is a closed loop or cyclic system wherein one instantaneous output is fed back into the system to obtain a new instantaneous output. In this way, the actual engine has been replaced by the dynamic engine simulator, and the control can be tested under dynamic conditions to determine its effectiveness.

In many cases it has been found that differentiation causes difficulties. Consequently, it is possible to re-orient the cam block so that the voltage output from the potentiometer 76 is proportional to the engine acceleration instead of to the engine speed. In this case, an integrating means would be substituted for the differentiating means at 108 and the voltage from the potentiometer would be integrated to give the engine speed.

By using this invention, the dynamic response of an engine can be simulated as an electrical, mechanical, or hydraulic output, without the use of intricate mathematics. In addition, the device is rugged and simple to operate. Another advantage is that in many forms of control testing it will be a new addition since it will allow closed-loop testing. Furthermore, since this invention is based on actual engine data, it affords greater possibilities of giving a non-linear representation of the engine. By this method, it may be possible to eliminate many of the simplifying assumptions which now accompany theoretical development of engine equations. Another advantage is that an effective fuel flow computer can be constructed while the engine is still in the design stage. Consequently, control designers may be able to have the control and the engine built at the same time, thereby eliminating the time lag between the appearance of a production engine and the control. The invention may also be used in an actual control as a component which will act as a reference, thereby giving information about the correct operation of the engine.

Obviously, many modifications and variations of the present invention are possible in the light of the above teachings. It is, therefore, to be understood that within the scope of the appended claims, the invention may be practiced otherwise than as specifically described.

What is claimed as the invention is:

1. A device for test-bench testing a control for a moving system being characterized by a non-linear differential equation, said device comprising means for feeding a voltage proportional to a predetermined characteristic into a servo-mechanism connected to a follower positioned on a three-dimensional cam surface for moving said follower over said three-dimensional surface in one direction, means for transposing the movement of said follower into an instantaneous output voltage, means for feeding said instantaneous output voltage into a second servomechanism for moving said follower over said surface in a second direction, and means for feeding the voltage, produced by the resultant movement of said follower in a third direction, back into said control, whereby a cyclic dynamic system is simulated, the movement of said follower is in said third direction being caused by its movements over said surface in the first and second directions.

2. Apparatus for analyzing the dynamic operating characteristics of a moving system comprising an element having a contour which is descriptive of the operating characteristics of the system, said element being positioned within a multi-dimensional coordinate system; a member which is adapted to be moved over the peripheral surface of the element; means for moving the member along one coordinate of the coordinate system in a manner proportional to a predetermined change in one dynamic characteristic of the moving system, the movement of the member along the said one coordinate of the system simultaneously producing movement thereof along another coordinate of the coordinate system; and means dependent on the movement along the said coordinates of the coordinate system for detecting the movement of the member along the said other coordinate of the coordinate system to determine the effect of changes of the said one dynamic characteristic of the moving system upon another dynamic characteristic of the moving system.

3. Apparatus for analyzing the dynamic characteristics of a moving system comprising an element having a contour which is descriptive of the said characteristics of the system, said element being positioned within a multi-dimensional coordinate system; a member which is adapted to be moved over the peripheral surface of the element; means for moving the member along a first coordinate of the coordinate system in a manner proportional to a predetermined change in one dynamic characteristic of the moving system, the movement of the member along the said said first coordinate of the system simultaneously producing movement thereof along a second coordinate of the coordinate system; means for controlling movement of the member along a third coordinate of the system in response to variations in the differential of the change in position of the member along the second coordinate of the coordinate system; the movement of the member along the third coordinate of the coordinate system simultaneously producing further movement thereof along the second coordinate of the coordinate system; and means dependent on the movement along the said coordinates of the coordinate system for detecting the movement of the member along the second coordinate of the coordinate system to determine the effect of changes of the said one dynamic characteristic of the moving system upon another dynamic characteristic of the moving system.

4. Apparatus for analyzing the dynamic characteristics of a moving system comprising an element having a contour which is descriptive of the said characteristics of the system, said element being positioned within a multi-dimensional coordinate system; a member which is adapted to be moved over the peripheral surface of the element; means for moving the member along a first coordinate of the coordinate system in a manner proportional to a predetermined change in one dynamic characteristic of the moving system, the movement of the member along the said first coordinate of the system simultaneously producing movement thereof along a second coordinate of the coordinate system; means for controlling movement of the member along a third coordinate of the system in response to changes in the position of the member along the second coordinate of the coordinate system; the movement of the member along the third coordinate of the coordinate system simultaneously producing further movement thereof along the second coordinate of the coordinate system; and means dependent on the movement along the said coordinates of the coordinate system for detecting the movement of the member along the second coordinate of the coordinate system to determine the effect of changes of the said one dynamic characteristic of the moving system upon another dynamic characteristic of the moving system.

5. Apparatus for analyzing the operating characteristics of a control mechanism for a moving system comprising an element having a contour which is descriptive of the inherent characteristics of the moving system, said element being positioned within a multi-dimensional coordinate system; a member which is adapted to be moved over the peripheral surface of the element; means for controlling movement of the member along one coordinate of the coordinate system in response to a change of the control mechanism, the movement of the member along the said coordinate of the coordinate system simultaneously producing movement thereof along another coordinate of the coordinate system; and means dependent on the movement along the said coordinates of the coordinate system for measuring the movement of the member along the said other coordinate of the coordinate system to determine the effect upon the moving system of the change of the control mechanism.

6. Apparatus for analyzing the operating characteristics of a control mechanism for a moving system comprising an element having a contour which is descriptive of the inherent characteristics of the moving system, said element being positioned within a three-dimensional coordinate system; a member which is adapted to be moved over the peripheral surface of the element; means for controlling movement of the member along a first coordinate of the coordinate system in response to a change in the condition of the control mechanism, the movement of the member along the first coordinate of the coordinate system simultaneously producing movement thereof along a second coordinate of the coordinate system; means for controlling movement of the member along a third coordinate of the coordinate system in response to changes in the position of the member along the second coordinate of the coordinate system; and means dependent on the movement along the said coordinates of the coordinate system for measuring the overall movement of the member along the second coordinate of the coordinate system to determine the effect of the original change in the condition of the control mechanism upon the moving system.

7. Apparatus for analyzing the operating characteristics of a control mechanism for a gas turbine comprising a cam having a contour which is descriptive of the inherent characteristics of the turbine, said cam being positioned within a three-dimensional coordinate system; a member which is adapted to be moved over the peripheral surface of the cam; servomotor means for controlling movement of the member along a first coordinate of the system in response to a change in the condition of the control mechanism, the movement of the member along the first coordinate of the system simultaneously producing movement thereof along a second coordinate of the system; servomotor means for controlling movement of the member along a third coordinate of the system in response to variations in the differential of the change in position of the member along the second coordinate of the system, the movement of the member along the third coordinate of the system simultaneously producing further movement thereof along the second coordinate of the system; and means for feeding a signal which is proportional to the movement of the member along the second coordinate of the system back into the control mechanism.

References Cited in the file of this patent

UNITED STATES PATENTS

| | | |
|---|---|---|
| 2,424,118 | Rast | July 15, 1947 |
| 2,457,558 | Hornfeck | Dec. 28, 1948 |
| 2,542,478 | Clark | Feb. 20, 1951 |
| 2,569,510 | Wolf | Oct. 2, 1951 |
| 2,569,816 | Lee | Oct. 2, 1951 |
| 2,569,818 | Lee | Oct. 2, 1951 |
| 2,617,587 | Carpenter | Nov. 11, 1952 |
| 2,628,539 | De Neergaard | Feb. 17, 1953 |
| 2,711,290 | Haviland | June 21, 1955 |

OTHER REFERENCES

Problem solving with the analog computer (Lakatos), Bell Laboratories Record, March 1951, page 111, Figure 6.